US011144133B2

(12) United States Patent
Yoo et al.

(10) Patent No.: US 11,144,133 B2
(45) Date of Patent: Oct. 12, 2021

(54) KEYBOARD AND METHOD OF SELECTING COLORS OF KEYS OF THE KEYBOARD

(71) Applicant: Corsair Memory, Inc., Fremont, CA (US)

(72) Inventors: Tae-Kyung Yoo, Kyunggi-Do (KR); Min-Ho Choi, Seoul (KR)

(73) Assignee: Corsair Memory, Inc., Fremont, CA (US)

( * ) Notice: Subject to any disclaimer, the term of this patent is extended or adjusted under 35 U.S.C. 154(b) by 25 days.

(21) Appl. No.: 16/890,139

(22) Filed: Jun. 2, 2020

(65) Prior Publication Data

US 2020/0293119 A1   Sep. 17, 2020

Related U.S. Application Data

(63) Continuation of application No. 15/977,089, filed on May 11, 2018, now Pat. No. 10,705,624, which is a continuation of application No. 14/693,579, filed on Apr. 22, 2015, now abandoned, which is a continuation of application No. 11/884,971, filed as application No. PCT/KR2006/000406 on Feb. 3, 2006, now abandoned.

(30) Foreign Application Priority Data

Feb. 23, 2005  (KR) .................. 10-2005-0014745
Mar. 31, 2005  (KR) .................. 10-2005-0026867

(51) Int. Cl.
*G06F 3/023*   (2006.01)
*G06F 3/02*    (2006.01)

(52) U.S. Cl.
CPC .......... *G06F 3/0238* (2013.01); *G06F 3/0202* (2013.01); *G06F 3/0219* (2013.01)

(58) Field of Classification Search
CPC ..... G06F 3/0238; G06F 3/0202; G06F 3/0219
See application file for complete search history.

(56) References Cited

U.S. PATENT DOCUMENTS 4,853,888 A   8/1989  Lata et al.
4,879,548 A   11/1989 Mitarai et al.
(Continued)

FOREIGN PATENT DOCUMENTS

JP   63-133225    6/1988   ............ G06F 3/023
JP   05-225854    9/1993
(Continued)

OTHER PUBLICATIONS

International Search Report from corresponding PCT Application No. PCT/KR2006/000406, dated May 9, 2006.
(Continued)

*Primary Examiner* — Stacy Khoo
(74) *Attorney, Agent, or Firm* — Harness, Dickey & Pierce, P.L.C.

(57) ABSTRACT

The present invention discloses a keyboard comprising light emitting devices, each respectively disposed below a key to lighten the top surface of the key; and a micro controller unit transmitting signals generated by each key to the computer, having switches for controlling the light emitting devices, and controlling switches according to signals transmitted from the computer, and a method of selecting the colors of the keys of the same.

16 Claims, 3 Drawing Sheets

(56) References Cited

U.S. PATENT DOCUMENTS

| | | |
|---|---|---|
| 5,408,060 A | 4/1995 | Muurinen |
| 5,557,300 A | 9/1996 | Satoh |
| 5,748,177 A | 5/1998 | Baker et al. |
| 5,818,361 A | 10/1998 | Acevedo |
| 5,936,554 A | 8/1999 | Stanek |
| 6,046,730 A | 4/2000 | Bowen et al. |
| 6,199,996 B1 | 3/2001 | Katrinecz, Jr. et al. |
| 6,217,183 B1 | 4/2001 | Shipman |
| 6,281,812 B1 | 8/2001 | Kim |
| 6,284,988 B1 | 9/2001 | Watanabe et al. |
| 6,320,519 B1 | 11/2001 | Hsu et al. |
| 6,322,229 B1 | 11/2001 | Chan et al. |
| 6,359,572 B1 | 3/2002 | Vale |
| 6,545,232 B1 | 4/2003 | Huo-Lu |
| 6,590,508 B1 | 7/2003 | Howell et al. |
| 6,609,805 B1 | 8/2003 | Nelson |
| 6,648,530 B2 | 11/2003 | Kamei et al. |
| 6,677,931 B2 | 1/2004 | Chi et al. |
| 6,747,402 B2 | 6/2004 | Hato et al. |
| 6,764,191 B2 | 7/2004 | Douzono et al. |
| 6,871,978 B2 | 3/2005 | Chan et al. |
| 6,918,677 B2 | 7/2005 | Shipman |
| 6,929,391 B2 | 8/2005 | Hotelling |
| 6,950,087 B2 | 9/2005 | Knox et al. |
| 7,073,916 B2 | 7/2006 | Yin et al. |
| 7,126,498 B2 | 10/2006 | Levy |
| 7,151,953 B2 | 12/2006 | Hamada et al. |
| 7,333,031 B1 | 2/2008 | Bantner |
| 7,369,064 B2 | 5/2008 | Yeh |
| 7,417,624 B2 | 8/2008 | Duff |
| 7,573,463 B2 | 8/2009 | Liess |
| 10,705,624 B2 * | 7/2020 | Yoo .................. G06F 3/0238 |
| 2002/0196619 A1 | 12/2002 | Chou |
| 2003/0000817 A1 | 1/2003 | Farage et al. |
| 2005/0073446 A1 | 4/2005 | Lazaridis et al. |
| 2005/0134573 A1 | 6/2005 | Pearson |
| 2006/0022951 A1 | 2/2006 | Hull |

FOREIGN PATENT DOCUMENTS

| | | |
|---|---|---|
| JP | 06-131087 | 5/1994 |
| JP | 2000-215748 A | 8/2000 |
| JP | 2002-362188 A | 12/2002 |
| KR | 20-1998-0024982 U | 7/1998 |
| KR | 10-1998-0026397 B1 | 7/1999 |
| KR | 10-2000-0018792 | 10/2000 |
| KR | 20-0299428 | 12/2002 |
| KR | 10-2004-0025778 A | 3/2004 |
| KR | 10-2005-0022750 A | 3/2005 |
| TW | 385405 B | 3/2000 |
| TW | 529187 B | 4/2003 |

OTHER PUBLICATIONS

Office Action dated Nov. 10, 2009 issued in Japanese Patent Application No. 2007-556966.

Foreign Patent Office Communication and its English translation for corresponding Taiwanese Patent Application No. 095105594, 9 pages, dated Jan. 29, 2010.

Office Action (Non-Final) from corresponding U.S. Appl. No. 15/977,089, dated Jul. 20, 2018.

Office Action (Final) from corresponding U.S. Appl. No. 15/977,089, dated Mar. 8, 2019.

Office Action (Non-Final) from corresponding U.S. Appl. No. 15/977,089, dated Jun. 27, 2019.

* cited by examiner

KEYBOARD AND METHOD OF SELECTING COLORS OF KEYS OF THE KEYBOARD

CROSS-REFERENCE TO RELATED APPLICATIONS

This application is a continuation of U.S. application Ser. No. 15/977,089, filed on May 11, 2018, which is a continuation of U.S. Application No. 4/693,579, filed Apr. 22, 2015, which is a continuation of U.S. application Ser. No. 11/884,971, filed Jun. 6, 2008, which is a national phase application of PCT Application No. PCT/KR2006/000406, filed on Feb. 3, 2006, which claims the benefit and priority to Korean Patent Application No. 10-2005-0026867, filed Mar. 31, 2005 and to Korean Patent Application No. 10-2005-0014745 filed Feb. 23, 2005. The entire disclosures of the applications identified in this paragraph are incorporated herein by references.

TECHNICAL FIELD

The present invention relates to a keyboard and a method of selecting colors of keys of the same, and more particularly, to a keyboard and a method of selecting colors of keys of the same by a software operation.

BACKGROUND ART

A keyboard of a computer has about 100 keys. In the conventional art, light emitting diodes (LED) are installed below the keys so that the keys can attract attention or can be used in a dark space.

FIG. 1 illustrates an apparatus for selectively displaying characters of a keyboard disclosed under Korean Patent Registration Official Gazette 10-0222374. LEDs D1 and D2 are disposed below an English character 'A' and a Korean character 'mi-um' (but it is illustrated as a Greek character "ε" in FIG. 1 for PCT publication). The LED D1 or D2 lightens the English character 'A' or the Korean character 'mi-um' by an operation of a switch 100, thereby showing the current state of the keyboard.

However, this technology relates to lightening English characters or Korean characters of the keys by the LED D1 or D2, just using a Korean/English conversion key which controls the switch 100.

DISCLOSURE OF INVENTION

Technical Problem

The present invention is achieved to solve the above problems. An object of the present invention is to provide a keyboard which allows the user to select colors of keys by software mounted on a computer, and a method thereof.

Another object of the present invention is to provide a keyboard which can obtain various colors by using RGB (red, green and blue) LEDs, and a method of selecting the colors of the keys of the same.

Technical Solution

In order to achieve the above-described objects of the invention, there is provided a keyboard being connected to a computer as an input means and including a plurality of keys each respectively including a symbol region on its top surface, the keyboard including: light emitting devices each respectively disposed below a key to lighten the top surface of the key; and a micro controller unit transmitting signals generated by each key to the computer, having switches for controlling the light emitting devices, and controlling the switches according to signals transmitted from the computer.

Differently from a general micro controller unit, the micro controller unit does not control the light emitting devices by the operation of a special key of the keyboard, but controls the built-in switches operated by using the colors processed by software mounted on the computer and information on the designated keys. Therefore, the light emitting devices can respectively lighten keys with the designated color or colors.

There is also provided a method of selecting colors of keys of a keyboard, the keyboard being connected to a computer as an input means, and including a plurality of keys each respectively including a symbol region on its top surface, light emitting devices each respectively disposed below a key to lighten the top surface of the key, and a micro controller unit having switches for controlling the light emitting devices, the method including: a first step for receiving a request of selecting the colors of the keys of the keyboard from an input device; a second step for displaying a screen on a monitor for key selection and color selection of the selected key; a third step for receiving information on the color-selected key from the input device; and a fourth step for transmitting the information to the micro controller unit of the keyboard.

Preferably, the method further includes a fifth step for controlling, at the micro controller unit, the light emitting devices by the switches according to the transmitted information.

Preferably, a mouse is mostly used as the input device. The keyboard itself can be operated as the input device.

Advantageous Effects

In accordance with the present invention, the user can apply wanted colors to the target keys.

The user can improve operational efficiency by increasing visibility of the characters often used in the computer operation using many keys of the keyboard. Also, the user can improve operational efficiency with the customized keyboard by obtaining target color characters by light sources having three primary colors.

Furthermore, the user can perform the computer operation even in a dark space.

BRIEF DESCRIPTION OF THE DRAWINGS

The present invention will become better understood with reference to the accompanying drawings which are given only by way of illustration and thus are not limitative of the present invention, wherein.

Figure 2:
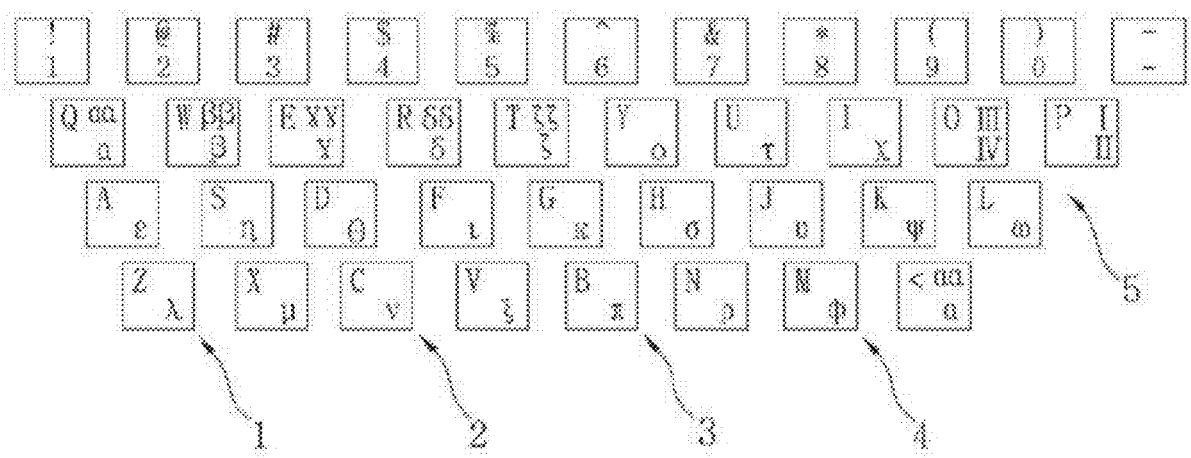
FIG. 2 illustrates some keys of a keyboard in accordance with the present invention.
Figure 3:
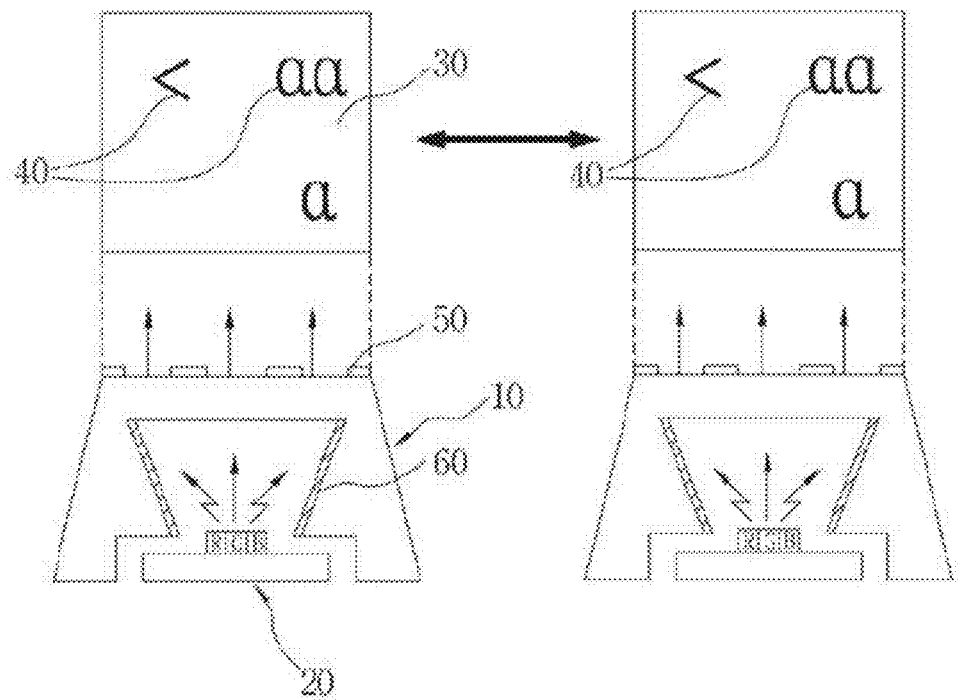
FIG. 3 illustrates one example of the key of the keyboard in accordance with the present invention.
Figure 4:
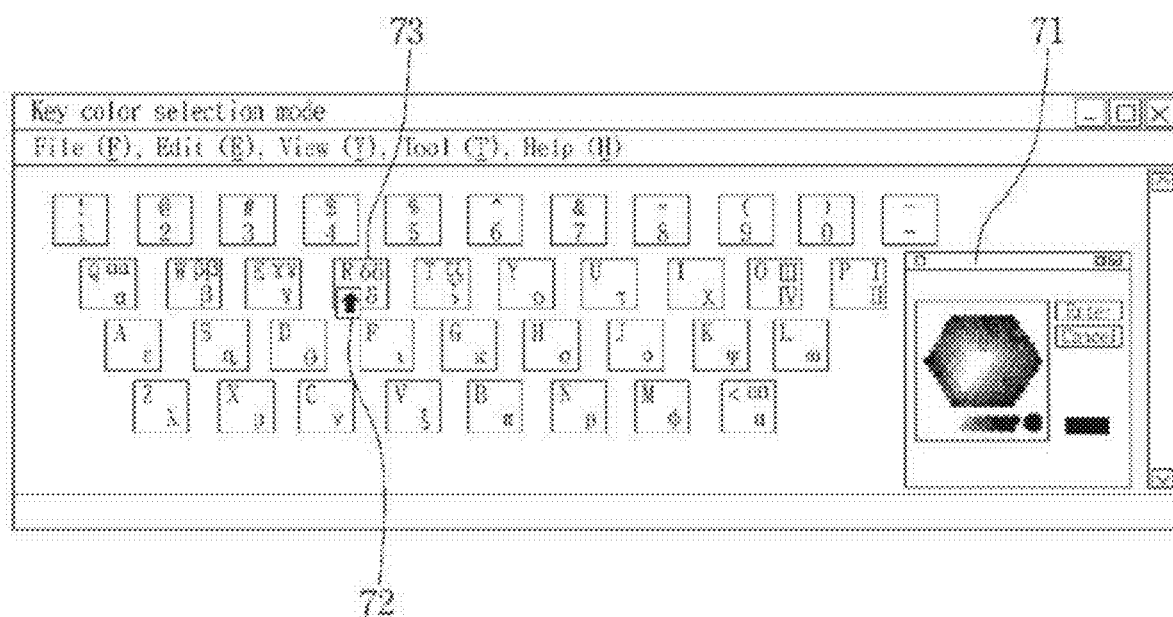
FIG. 4 illustrates a method of selecting colors of the keys on a monitor in accordance with the present invention.

The characters expressed in the Greek alphabet of FIGS. 2 to 4 are the substitution of the characters expressed in the Korean alphabet of FIGS. 2 to 4 at the time of the PCT filing, which is for PCT publication.

MODE FOR THE INVENTION

A keyboard and a method of selecting colors of keys of the same in accordance with the present invention will now be described in detail with reference to the accompanying drawings.

FIG. 2 illustrates some keys of the keyboard in accordance with the present invention. The keys include red color keys 1, blue color keys 2, given color keys 3, violet color keys 4 and orange color keys 5.

FIG. 3 illustrates one example of the key of the keyboard in accordance with the present invention. A light emitting device 20 having RGB (red, green and blue) diodes is disposed below a key 10.

The top surface 30 of the key 10 is formed wholly opaque and a symbol region 40 composed of a character or a mark is funned to transmit light. That is, the key 10 is made of a light transmitting material, and a coating solution 50 is opaquely coated on the top surface 30 or the whole outer surface of the key 40 and removed from the area corresponding to the symbol region 40 by laser processing. Also, the key 10 is formed by double injection so that only the symbol region 40 can transmit light. In addition, the whole key 10 or the top surface 30 of the key 10 may be formed to transmit light, with the symbol region 40 opaque. In the case that a reflecting plate 60 is formed on the inner surface of the key 10 by plating, the reflecting plate 60 can improve efficiency of light emitted to the top surface 30 of the key 10.

In the right side of FIG. 3, the symbol region 40 has a blue color. Such a color can be varied by controlling the light emitted from the light emitting device 20.

The method of selecting the colors of the keys of the keyboard in accordance with the present invention will now be described.

FIG. 4 illustrates the method of selecting the colors of the keys on a monitor in accordance with the present invention. Color selection is carried out by displaying the keys of the keyboard on the screen, designating the color by a color designating window 71, and selecting the corresponding key 73 by a cursor 72.

Figure 1:
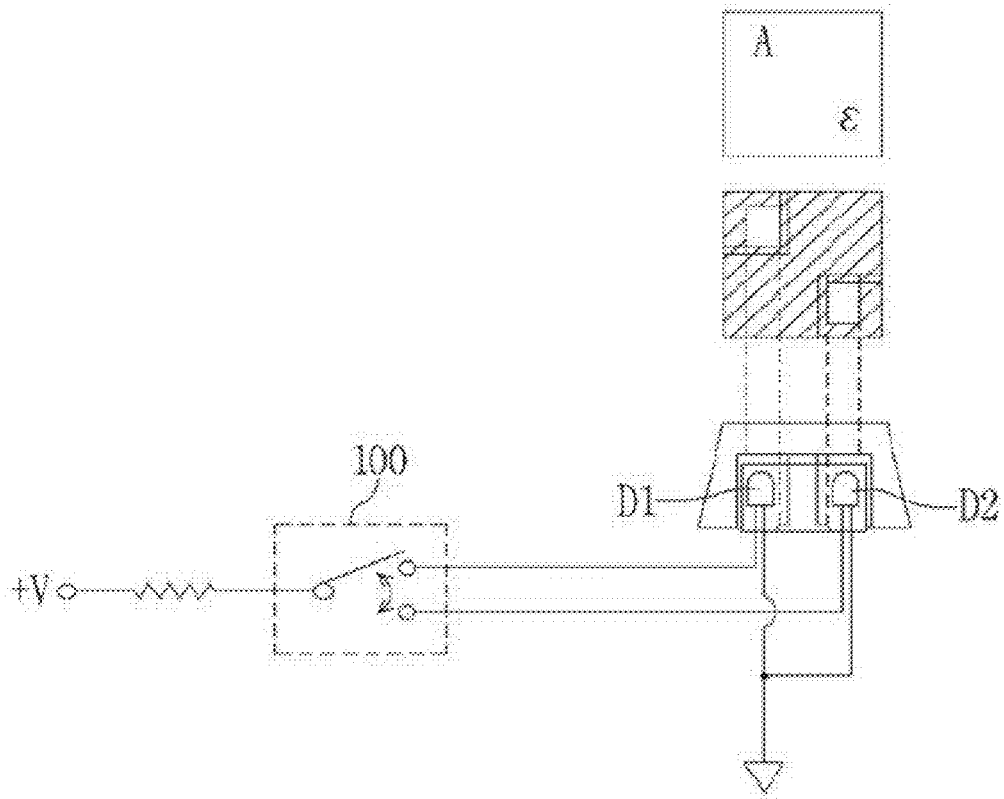
FIG. 1 illustrates an apparatus for selectively displaying characters of a keyboard disclosed under Korean Patent Registration Official Gazette 10-0222374.
Figure 5:
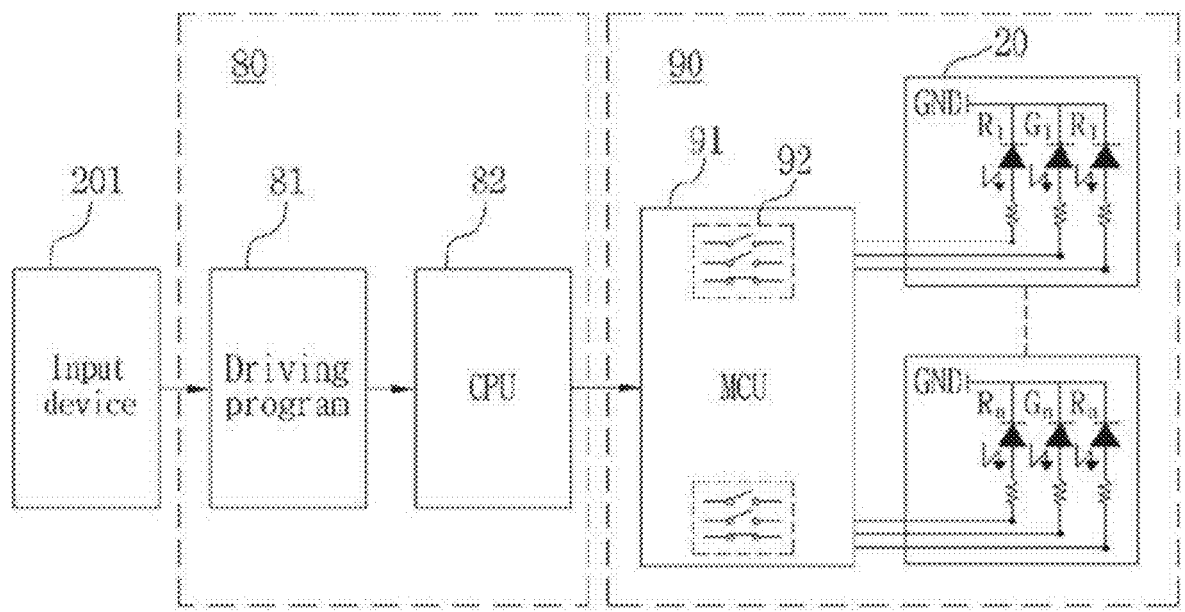
FIG. 5 illustrates one example of a physical structure for selecting the colors of the keys in accordance with the present invention.

FIG. 5 illustrates one example of a physical structure for selecting the colors of the keys in accordance with the present invention. The operational principle of the light emitting devices 20 is similar to that of the general LEDs of FIG. 1.

In general, the keyboard is controlled by a built-in control IC, namely, a micro controller unit (MCU). Basically, the MCU transmits electric signals generated by mechanical signals of the keys of the keyboard to a computer main body. Besides, the MCU turns on and off the LEDs disposed at the upper portion of the right side of the keyboard for displaying the operation of function keys such as scroll lock and caps lock.

In order to designate the colors of the keys of the keyboard and emit the designated colors, by the light emitting devices disposed below the keys, a driving program 81 for displaying the keys of the keyboard on the screen upon the request of the user shown in FIG. 4, enabling the user to designate the colors of the keys, receiving the designated colors, and finally transmitting the colors to the MCU of the keyboard is mounted on a computer 80 as software. A keyboard 90 includes an MCU 91 having switches 92 for controlling the current supplied to the light emitting devices 20.

The user requests a color selection mode to the computer 80 through an input device 201 such as a mouse. The computer 80 executes the driving program 81 in response to the request of the user. After color selection, the computer 80 transmits the related information to the MCU 91 of the keyboard 90. The series of processes of the computer 80 are performed by a CPU 82 of the computer 80.

For example, when the user designates the specific key with the red color, the MCU 91 turns off the switches of the LEDs corresponding to the blue and green colors and turns on the switch of the LED corresponding to the red color to display the key with the red color. In addition, when the user designates the key with the violet color, the MCU 91 turns on the switches of the LEDs corresponding to the blue and red colors, thereby displaying the key with the violet color. In addition, the same color can be displayed with various spectra by controlling the amount of supplied current.

Figure 6:
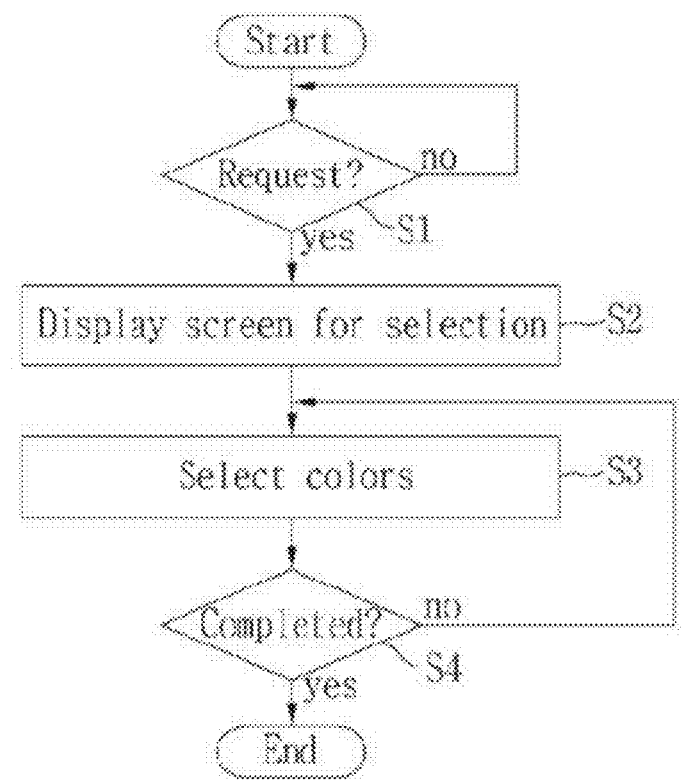
FIG. 6 illustrates a series of processes performed in a driving program.

FIG. 6 illustrates the series of processes performed in the driving program. Whether the color selection request is received from the user is confirmed in an initial stage. If the color selection request is received (S1), the screen for color selection is displayed to the user (S2). The processes of selecting the keys and the colors are consecutively carried out on the screen as shown in FIG. 3 (S3). When the user notifies completion of the selection process (S4), the driving program 81 is ended.

Although the preferred embodiments of the present invention have been described, it is understood that the present invention should not be limit to these preferred embodiments but various changes and modifications can be made by one skilled in the art within the spirit and scope of the present invention as hereinafter claimed.

The invention claimed is:

1. A method for lighting a keyboard including a plurality of keys, a plurality of light emitting devices disposed below the plurality of keys, a micro controller unit, and multiple sets of switches for controlling the plurality of light emitting devices, each of the light emitting devices including red, green and blue light emitting diodes, the method comprising:

receiving key selections and illumination color selections for at least a subset of the plurality of keys from a user, wherein each key and illumination color selection includes receiving a selection of a specific key displayed on a screen and receiving a designation of a color to illuminate the selected specific key;

transmitting, for each selected specific key, the received illumination color selection for illuminating the selected specific key to the micro controller unit; and controlling, by the switches via the micro controller unit, current supplied to each of the red, green and blue light emitting diodes of the light emitting devices corresponding to the received key selections to independently lighten a top surface of each corresponding key with the received illumination color selection for the corresponding key.

2. The method of claim 1, wherein the top surface of each key is opaque other than a symbol region on the top surface that is formed to transmit light.

3. The method of claim 1, wherein the top surface of each key is formed to transmit light other than a symbol region on the top surface that is opaque.

4. The method of claim 1, wherein a reflecting plate is positioned inside of each key to improve efficiency of light emitted to the top surface of the key.

5. The method of claim 1, wherein the micro controller unit controls an amount of the current supplied to the light emitting devices to display various spectra of a same illumination color.

6. The method of claim 1, wherein each of the plurality of keys comprises a light transmitting material, and a coating solution opaquely coats at least the top surface of said key with a symbol region removed from the coating solution by laser processing.

7. The method of claim 1, further comprising receiving a request from a user to initiate a driving program for key selection and illumination color selection for the plurality of keys, the driving program configured to allow a different illumination color selection for each of the plurality of keys with at least three different ones of the plurality keys having three different illumination colors.

8. The method of claim 7, further comprising displaying, by the driving program, keys of the keyboard and a color palette on a monitor including the screen to receive the key selections and the illumination color selections for the plurality of keys.

9. A keyboard lighting system comprising:
a plurality of keys;
a plurality of light emitting devices disposed below the plurality of keys, each of the light emitting devices including red, green and blue light emitting diodes;
a micro controller unit; and
multiple sets of switches for controlling the plurality of light emitting devices, each set of switches corresponding to a different one of the plurality of keys, and each set including three switches for controlling said red, green and blue light emitting diodes of said corresponding one of the plurality of keys, wherein the micro controller unit is configured to:
receive key selections and illumination color selections for the plurality of keys from a user, the received selections including at least three different illumination colors corresponding to three different ones of the plurality of keys; and
control, via the switches, current supplied to each of the red, green and blue light emitting diodes of the light emitting devices corresponding to the received key selections to independently lighten a top surface of each corresponding key with the received illumination color selection for the corresponding key.

10. The system of claim 9, wherein the top surface of each key is opaque other than a symbol region on the top surface that is formed to transmit light.

11. The system of claim 9, wherein the top surface of each key is formed to transmit light other than a symbol region on the top surface that is opaque.

12. The system of claim 9, further comprising multiple reflecting plates, each reflecting plate positioned inside of one of the keys to improve efficiency of light emitted to the top surface of the key.

13. The system of claim 9, wherein the micro controller unit is configured to control an amount of the current supplied to the light emitting devices to display various spectra of a same illumination color.

14. The system of claim 9, wherein each of the plurality of keys comprises a light transmitting material, and a coating solution opaquely coats at least the top surface of said key with a laser-processing removed symbol region removed from the coating solution.

15. The system of claim 9, further comprising a display, the display configured to receive a request from a user to initiate a driving program for key selection and illumination color selection for the plurality of keys.

16. The system of claim 9, wherein the display is configured to display the keys and a color palette on a monitor to receive the key selections and the illumination color selections for the plurality of keys.

* * * * *